(12) United States Patent
Shindo et al.

(10) Patent No.: US 12,397,478 B2
(45) Date of Patent: Aug. 26, 2025

(54) FORMING DEVICE AND FORMING METHOD

(71) Applicant: MITSUBISHI HEAVY INDUSTRIES, LTD., Tokyo (JP)

(72) Inventors: Kentaro Shindo, Tokyo (JP); Kazuki Noma, Tokyo (JP); Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 69 days.

(21) Appl. No.: 17/984,638

(22) Filed: Nov. 10, 2022

(65) Prior Publication Data

US 2023/0150175 A1 May 18, 2023

(30) Foreign Application Priority Data

Nov. 12, 2021 (JP) ................................. 2021-184792

(51) Int. Cl.
*B29C 43/02* (2006.01)
*B29C 43/14* (2006.01)
(Continued)

(52) U.S. Cl.
CPC .......... *B29C 43/021* (2013.01); *B29C 43/146* (2013.01); *B29C 43/18* (2013.01);
(Continued)

(58) Field of Classification Search
None
See application file for complete search history.

(56) References Cited

U.S. PATENT DOCUMENTS

| 6,558,590 B1 | 5/2003 | Stewart |
| 2003/0227107 A1 | 12/2003 | Stewart |
| 2022/0305742 A1 | 9/2022 | Shimada et al. |

FOREIGN PATENT DOCUMENTS

| JP | 2002-538991 A | 11/2002 |
| JP | 2004-322442 A | 11/2004 |

(Continued)

OTHER PUBLICATIONS

German Office Action for German Application No. 102022211850.2, dated Jul. 7, 2023, with an English translation.
(Continued)

*Primary Examiner* — Michael M. Robinson
(74) *Attorney, Agent, or Firm* — BIRCH, STEWART, KOLASCH & BIRCH, LLP

(57) ABSTRACT

Provided is a forming device including: a lower die; an upper die for forming a laminated body along the surface shape of the lower die by pressing the laminated body against the lower die; a pushing force generating mechanism that generates pushing force for pressing the upper die against the lower die; and a control unit that controls the pushing force generating mechanism, the upper die has a plurality of forming members aligned in the longitudinal direction, the pushing force generating mechanism has a plurality of pushing force generating units connected to the plurality of forming members and configured to generate pushing force for pressing the forming members against the lower die, and the control unit controls the plurality of pushing force generating units so as to press a pair of forming members arranged adjacent in the longitudinal direction toward the lower die at different timings from each other.

4 Claims, 16 Drawing Sheets

(51) Int. Cl.
  *B29C 43/18*   (2006.01)
  *B29C 43/36*   (2006.01)
  *B29C 43/58*   (2006.01)
  *B29L 31/00*   (2006.01)

(52) U.S. Cl.
  CPC ............ *B29C 2043/3602* (2013.01); *B29C 2043/3626* (2013.01); *B29C 2043/3634* (2013.01); *B29C 2043/5833* (2013.01); *B29L 2031/001* (2013.01)

(56) References Cited

FOREIGN PATENT DOCUMENTS

| | | |
|---|---|---|
| JP | 2006-335049 A | 12/2006 |
| JP | 5278790 B2 | 9/2013 |
| WO | 2021/200047 A1 | 10/2021 |

OTHER PUBLICATIONS

Japanese Office Action for Japanese Application No. 2021-184792, dated Apr. 30, 2025, with English translation.

FORMING DEVICE AND FORMING METHOD

CROSS-REFERENCE TO RELATED APPLICATIONS

This application claims the benefit of priority to Japanese Patent Application Number 2021-184792 filed on Nov. 12, 2021. The entire contents of the above-identified application are hereby incorporated by reference.

BACKGROUND

1. Technical Field

The present disclosure relates to a forming device and a forming method for forming a laminated body of a plurality of laminated sheet materials containing reinforced fibers.

2. Description of Related Art

Structural members of aircrafts or the like have various sectional shapes, and as a method for manufacturing such a structural member, there is a known method of pressing a laminated body of a plurality of laminated sheet materials containing reinforced fibers against a forming die and forming the laminated body to obtain an intended shape (for example, see Japanese Patent No. 5278790).

Japanese Patent No. 5278790 discloses arranging a laminated body in a forming die and applying a pressure thereto by a bladder to form the laminated body along the forming die.

When a laminated body is formed along a forming die, a wrinkle may occur in a particular portion such as a region having a large change in the shape of the forming die. Such a wrinkle is likely to occur particularly when the forming die has a curved surface shape having a curvature in the longitudinal direction and also has a curved portion including a concave shape or a convex shape in the width direction orthogonal to the longitudinal direction.

When a pressure is applied by a bladder as disclosed in Japanese Patent No. 5278790, however, a region that is preferentially formed or a timing that the forming takes place is already determined in accordance with the positional relationship between the bladder and the forming die. It is therefore difficult to suitably adjust a region to preferentially perform forming, a timing to perform forming, or the like, such as by pressing a region where a wrinkle is likely to occur against a forming die prior to pressing other regions.

BRIEF SUMMARY

The present disclosure has been made in view of such circumstances and intends to provide a forming device and a forming method that can suppress a problem of a wrinkle occurring in a laminated body when forming the laminated body along a forming die.

A forming device for forming a laminated body of a plurality of laminated sheet materials containing reinforced fibers according to one aspect of the present disclosure includes a first forming die having a curved surface that extends in a longitudinal direction and includes at least any one of a concave shape and a convex shape with respect to a width direction; a second forming die configured to form the laminated body along a surface shape of the first forming die by pressing the laminated body against the first forming die; a pushing force generating mechanism configured to generate pushing force for pressing the second forming die against the first forming die; and a control unit configured to control the pushing force generating mechanism, wherein the second forming die has a plurality of forming members aligned in the longitudinal direction, wherein the pushing force generating mechanism has a plurality of pushing force generating units connected to the plurality of forming members and configured to generate pushing force for pressing the forming members against the first forming die, and wherein the control unit controls the plurality of pushing force generating units so as to press a pair of the forming members arranged adjacent in the longitudinal direction against the first forming die at different timings from each other.

A forming method for forming a laminated body of a plurality of laminated sheet materials containing reinforced fibers according to one aspect of the present disclosure includes a fixing step of fixing one end of the laminated body to a first forming die having a curved surface that extends in a longitudinal direction and includes at least any one of a concave shape and a convex shape with respect to a width direction; and a forming step of forming the laminated body along a surface shape of the first forming die by pressing a second forming die having a plurality of forming members aligned in the longitudinal direction against the first forming die, wherein the forming step presses a pair of the forming members arranged adjacent in the longitudinal direction against the first forming die at different timings from each other.

According to the present disclosure, it is possible to provide a forming device and a forming method that can suppress a problem of a wrinkle occurring in a laminated body when forming the laminated body along a forming die.

DETAILED DESCRIPTION

First Embodiment

Figure 1:
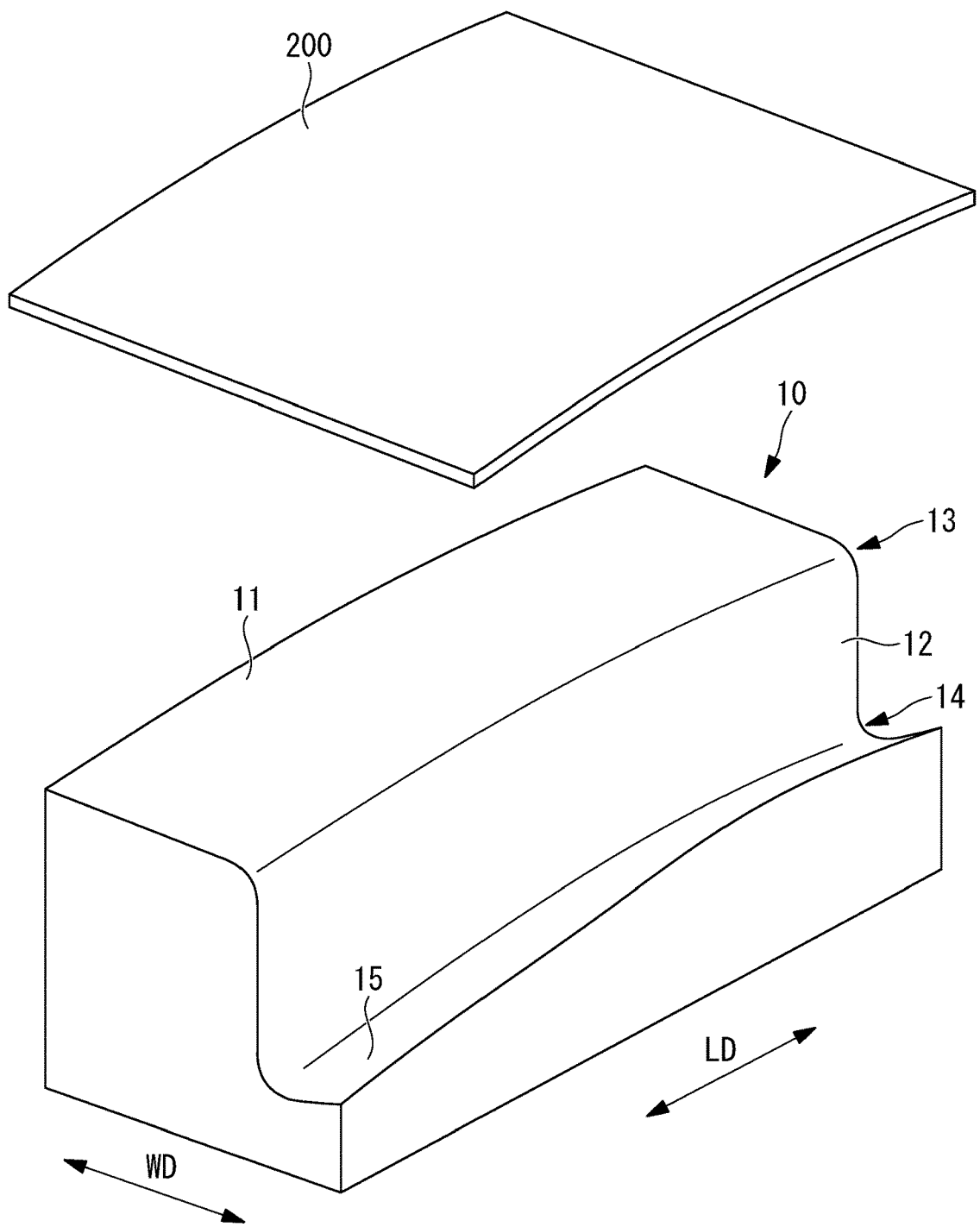
FIG. 1 is a perspective view illustrating a lower die and a laminated body according to a first embodiment of the present disclosure and illustrates a state before the laminated body is formed.
Figure 2:
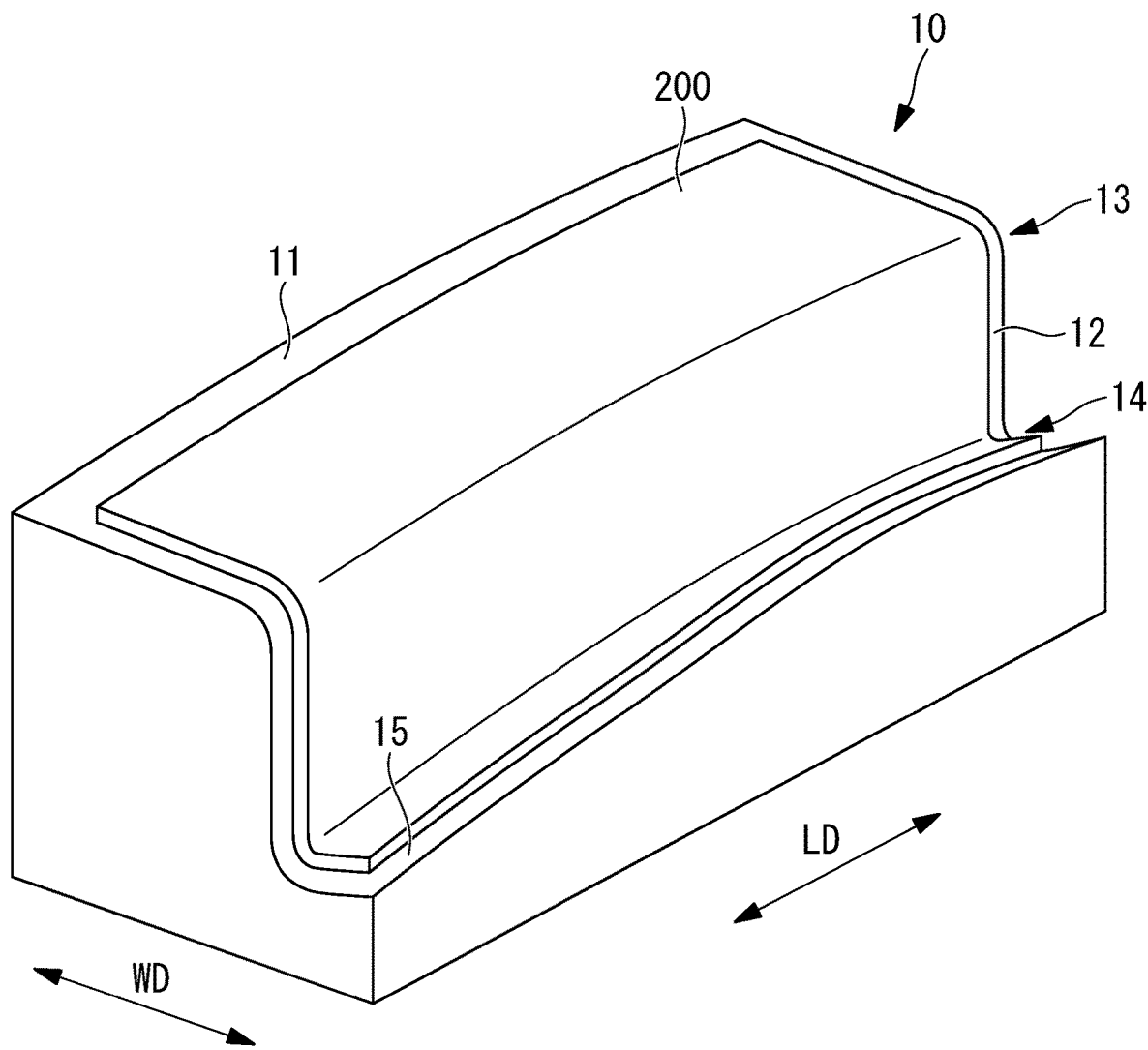
FIG. 2 is a perspective view illustrating the lower die and the laminated body according to the first embodiment of the present disclosure and illustrates a state after the laminated body has been formed.

A forming device 100 according to the first embodiment of the present disclosure and a forming method using the same will be described below with reference to the drawings. FIG. 1 is a perspective view illustrating a lower die 10 and a laminated body 200 according to the present embodiment and illustrates a state before the laminated body 200 is formed. FIG. 2 is a perspective view illustrating the lower die 10 and the laminated body 200 according to the present embodiment and illustrates a state after the laminated body 200 has been formed.

The forming device 100 of the present embodiment is a device that forms the laminated body 200, which is a plurality of laminated sheet materials, along the surface shapes of the lower die (first forming die) 10 and an upper die (second forming die) 20. As illustrated in FIG. 1, the laminated body 200 before formed is a planarly laminated multilayered sheet-like composite materials.

In the present embodiment, as the laminated body 200, a planarly shaped laminated body of a plurality of laminated reinforced fiber sheets (dry sheets) containing no matrix resin is used. When reinforced fiber sheets containing no matrix resin are used, a resin transfer molding (RTM) method is used in which the laminated body 200 formed along the surface shapes of the lower die 10 and the upper die 20 is arranged in a molding die (not illustrated) and a resin material is injected inside the molding die to impregnate the reinforced fibers therewith and mold the same. The reinforced fiber contained in the reinforced fiber sheet may be, for example, carbon fiber, glass fiber, aramid fiber, or the like.

Although, as described above, a plurality of sheet-like reinforced fiber sheets containing no matrix resin are used as the laminated body 200 in the present embodiment, another manner may be possible. For example, a plurality of laminated reinforced fiber sheets containing a matrix resin may be used as the laminated body 200.

As the matrix resin contained in the reinforced fiber sheets, either a thermosetting resin material or a thermoplastic resin material can be used. The thermosetting matrix resin is, for example, an epoxy resin, an unsaturated polyester, a vinyl ester, a phenol, a cyanate ester, a polyimide, or the like.

Examples of the thermoplastic matrix resin include polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI), polyetherketoneketone (PEKK), and the like.

When a thermoplastic resin is used as the matrix resin, the forming device 100 includes a heating mechanism (not illustrated) that can heat the thermoplastic resin contained in the laminated body 200 at the softening temperature or higher. By heating the thermoplastic resin at the softening temperature or higher by the heating mechanism, it is possible to form the laminated body 200 containing the thermoplastic resin along the surface shapes of the lower die 10 and the upper die 20.

Figure 3:
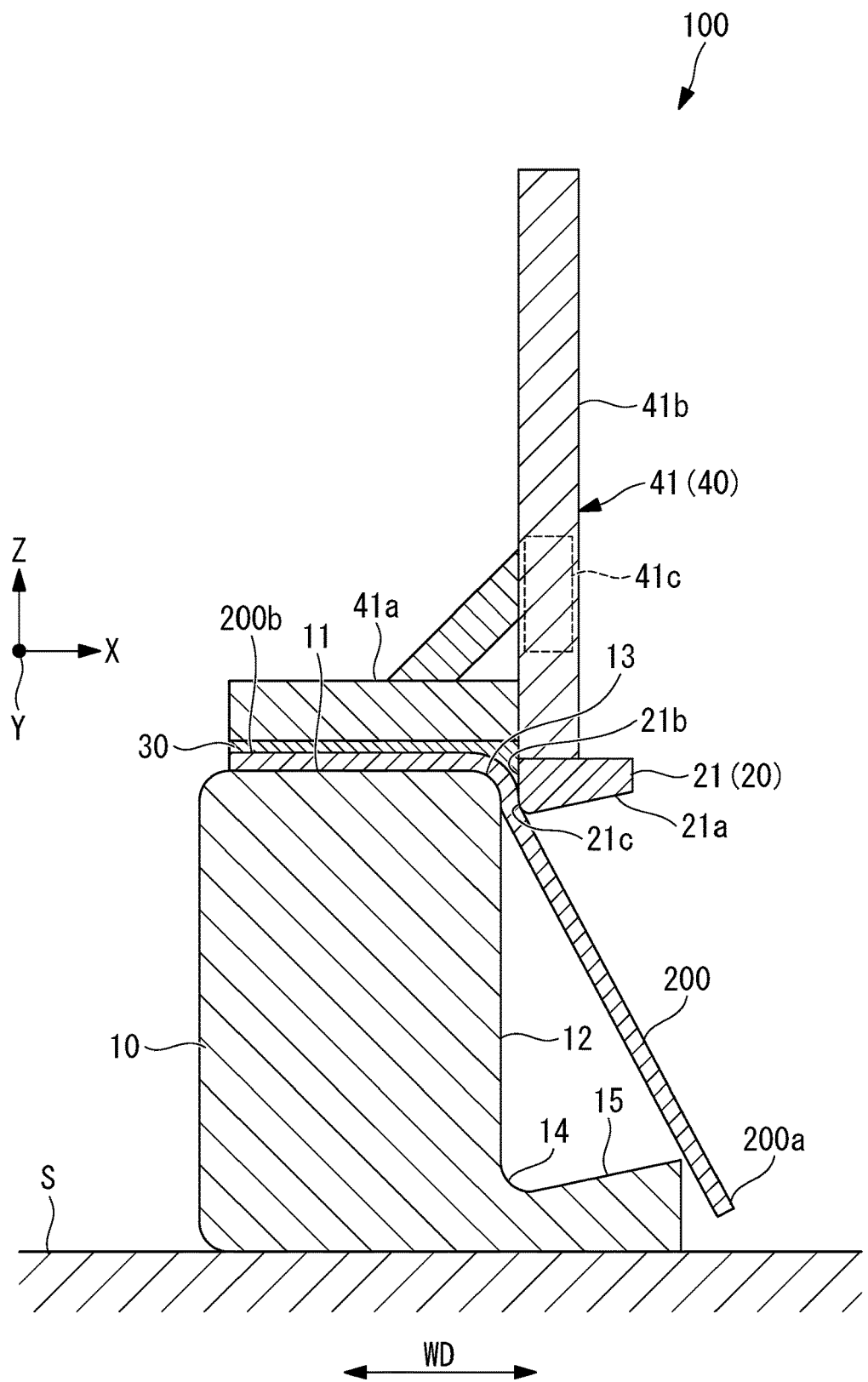
FIG. 3 is a sectional view illustrating a forming device according to the first embodiment of the present disclosure and illustrates a state before an upper die starts motion toward the lower die.
Figure 4:
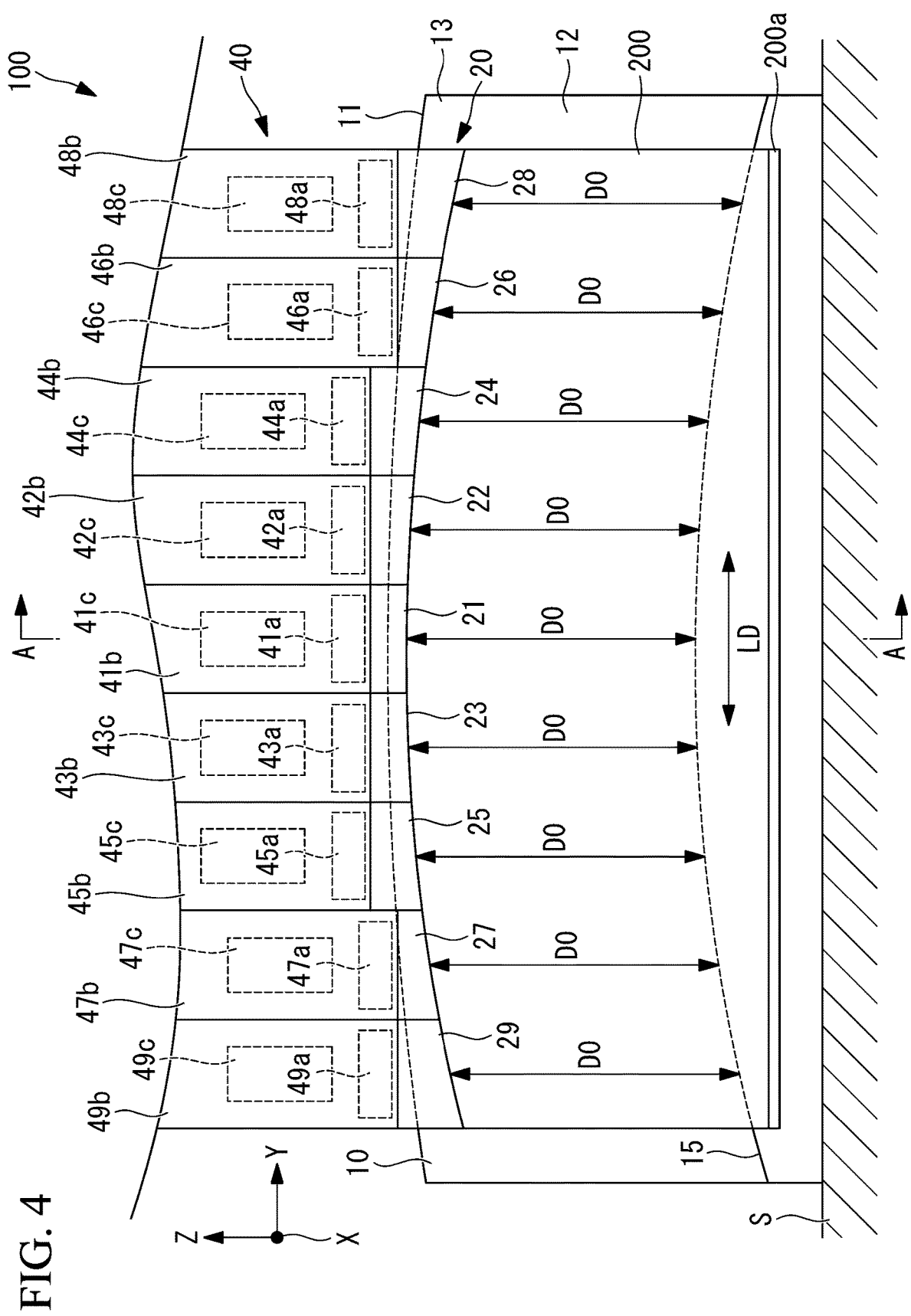
FIG. 4 is a right side view of the forming device illustrated in FIG. 3 and illustrates a state before the upper die starts motion toward the lower die.
Figure 5:
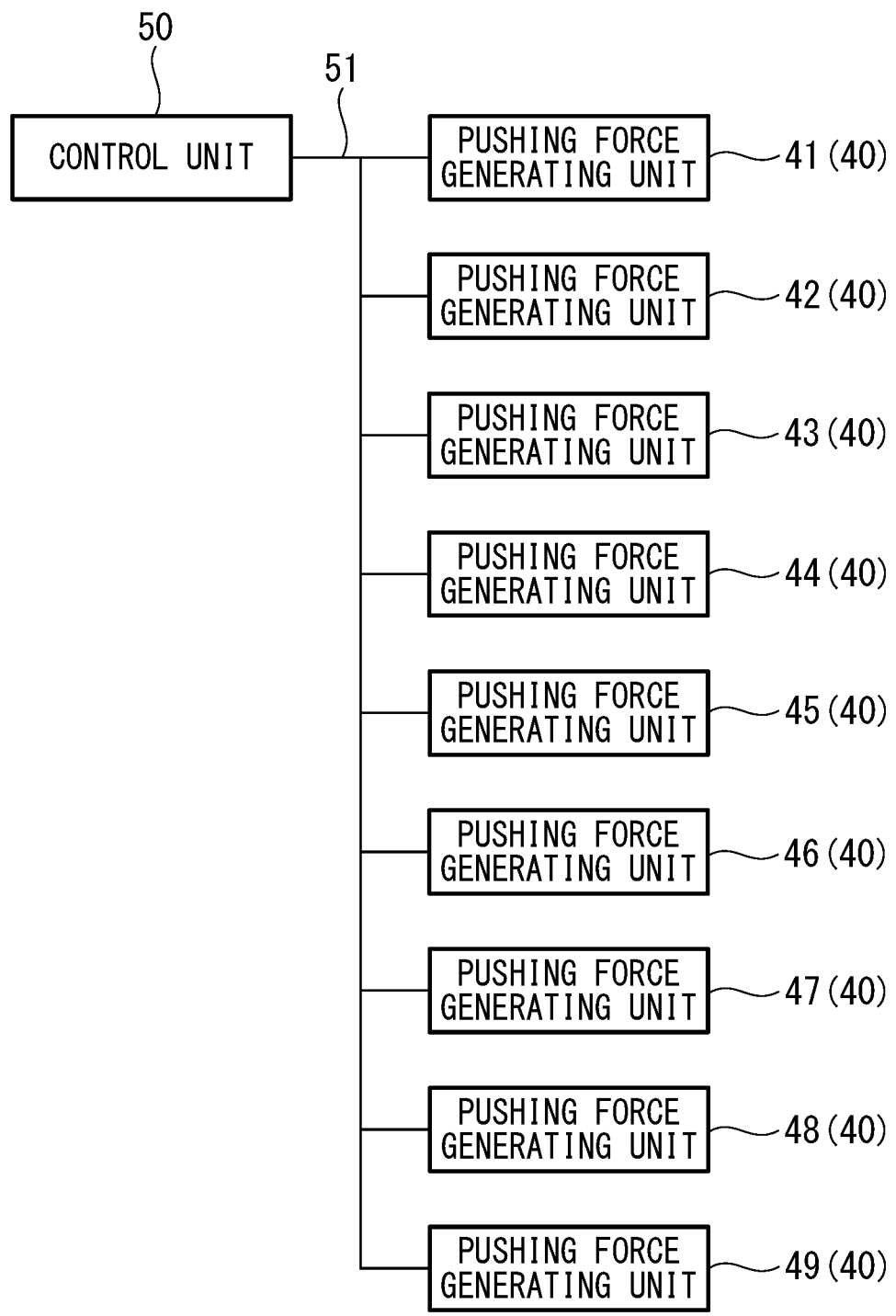
FIG. 5 is a block diagram illustrating a control configuration of the forming device according to the first embodiment of the present disclosure.

Details of the forming device 100 according to the present embodiment will be described with reference to the drawings. FIG. 3 is a sectional view illustrating the forming device 100 according to the present embodiment and illustrates a state before the upper die 20 starts motion toward the lower die 10. FIG. 4 is a right side view of the forming device illustrated in FIG. 3 and illustrates a state before the upper die starts motion toward the lower die. FIG. 5 is a block diagram illustrating a control configuration of the forming device 100 of the present embodiment. As illustrated in FIG. 3 to FIG. 5, the forming device 100 of the present embodiment includes the lower die 10, the upper die 20, an upper die (third forming die) 30, a pushing force generating mechanism 40, and a control unit 50.

The forming device 100 illustrated in FIG. 3 and FIG. 4 is arranged in a three-dimensional space. The X-axis, the Y-axis, and the Z-axis illustrated in FIG. 3 and FIG. 4 are axes intersecting each other in the three-dimensional space. The X-axis is an axis extending parallel to an installation surface S on which the lower die 10 is installed, and the Z-axis is an axis extending in a direction orthogonal to the installation surface S on which the lower die 10 is installed. The Y-axis is an axis orthogonal to both the X-axis and the Z-axis and extending in a sheet depth direction in FIG. 3.

The lower die 10 is a block-shape die having a surface shape for forming the laminated body 200 and is made of a metal material, for example. The lower die 10 has an upper surface (first forming surface) 11, a side surface (second forming surface) 12, a convex surface (curved surface) 13, a concave surface (curved surface) 14, and a bottom surface 15 as the surface shape for forming the laminated body 200. FIG. 3 is a sectional view taken along the arrow A-A of FIG. 4 and illustrates a cross section of the lower die 10 at or near the middle part in the longitudinal direction LD parallel to the Y-axis.

As illustrated in FIG. 3, the upper surface 11 of the lower die 10 is a surface extending planarly parallel to the X-axis. The side surface 12 of the lower die 10 is a surface extending planarly parallel to the Z-axis. The bottom surface 15 of the lower die 10 is a surface extending planarly in a direction intersecting the X-axis.

The convex surface 13 is a surface connected between the upper surface 11 and the side surface 12 and has a circular arc shape whose normal direction of the surface gradually changes so as to change from a surface parallel to the X-axis to a surface parallel to the Z-axis as a position on the convex surface 13 approaches the side surface 12 from the upper surface 11 parallel to the X-axis. The convex surface 13 is a portion including a convex shape with respect to the width direction WD parallel to the X-axis.

The concave surface 14 is a surface connected between the side surface 12 and the bottom surface 15 and has a circular arc shape whose normal direction of the surface gradually changes so as to change from a surface parallel to the Z-axis to a surface parallel to the X-axis as a position on the concave surface 14 approaches the bottom surface 15 from the side surface 12 parallel to the Z-axis and further change to a surface intersecting the X-axis. The concave surface 14 is a portion including a concave shape with respect to the width direction WD.

As illustrated in FIG. 3, the laminated body 200 has a first end region 200a and a second end region 200b in the width direction WD. The second end region 200b of the laminated body 200 is fixed to the lower die 10. The second end region 200b of the laminated body 200 is fixed to a predetermined position of the upper surface 11 of the lower die 10.

The shape of the lower die 10 illustrated in FIG. 3 may be another shape. For example, the upper surface 11 may be a surface extending in a direction different from the X-axis or may be a non-planar surface. Further, the side surface 12 may be a surface extending in a direction different from the Z-axis. Further, the convex surface 13 may have any convex shape different from a circular arc shape. Further, the concave surface 14 may have any concave shape different from a circular arc shape. Further, the bottom surface 15 may be a surface extending in a direction parallel to the X-axis or a direction inclined downward from the X-axis. The lower die 10 can be any shape including at least any one of a concave shape and a convex shape with respect to the width direction WD.

The upper die 20 is a block-like die for pressing the laminated body 200, the second end region 200b of which is fixed to the lower die 10, against the lower die 10 and forming the laminated body 200 along the surface shape of the lower die 10 and is made of a metal material, for example. The upper die 20 presses the laminated body 200 fixed to the lower die 10 against the side surface 12, the convex surface 13, the concave surface 14, and the bottom surface 15 of the lower die 10 and forms the laminated body 200 along the surface shapes of the lower die 10 and the upper die 20.

As illustrated in FIG. 4, the upper die 20 has a plurality of forming members 21, 22, 23, 24, 25, 26, 27, 28, and 29 aligned adjacent to each other in the longitudinal direction LD. As illustrated in FIG. 4, the distances in the Z-axis direction from the forming members 21 to 29 to the bottom surface 15 of the lower die 10 are the same distance DO. That is, the distances from the forming members 21 to 29 to the bottom surface 15 of the lower die 10 before starting motion toward the lower die 10 are the same.

As illustrated in FIG. 3, the forming member 21 has an under surface 21a, a side surface 21b, and a convex surface 21c as the surface shape for forming the laminated body 200. The under surface 21a of the forming member 21 is a surface extending planarly in a direction intersecting the X-axis. The side surface 21b of the forming member 21 is a surface extending planarly parallel to the Z-axis. The convex surface 21c is a surface connected between the under surface 21a and the side surface 21b and has a circular arc shape whose normal direction of the surface gradually changes so as to change from a surface intersecting the X-axis to a surface parallel to the Z-axis as a position on the convex surface 21c approaches the side surface 21b from the under surface 21a parallel to the X-axis. The convex surface 21c has a shape corresponding to the concave surface 14 of the lower die 10.

The forming member 21 has been described above, and since the same applies to the forming members 22, 23, 24, 25, 26, 27, 28, and 29, the description thereof will be omitted below. Note that the shape of the lower die 10 may have different shapes at respective positions along the longitudinal direction LD. When the shape of the lower die has different shapes at respective positions along the longitudinal direction LD, the shapes of the forming members 22, 23, 24, 25, 26, 27, 28, and 29 will differ, respectively.

As illustrated in FIG. 3, the upper die 30 is a block-like die for pressing a region at and near the second end region 200b of the laminated body 200 against the upper surface 11, which is adjacent to one side in the width direction WD of the convex surface 13 of the lower die 10, and is made of a metal material, for example. The upper die 30 presses the laminated body 200 fixed to the lower die 10 against the lower die 10 to form the laminated body 200 along the surface shapes of the lower die 10 and the upper die 30.

The pushing force generating mechanism 40 is a mechanism that generates a pushing force for pressing the upper die 20 against the lower die 10. As illustrated in FIG. 4, the pushing force generating mechanism 40 has pushing force generating units 41, 42, 43, 44, 45, 46, 47, 48, and 49. As illustrated in FIG. 4, the pushing force generating units 41 to 49 are connected to the forming members 21 to 29, respectively, and generate pushing force for pressing the forming members 21 to 29 against the lower die 10.

As illustrated in FIG. 3, the pushing force generating unit 41 has a fixing frame 41a, a slide frame 41b, and a drive unit 41c. The fixing frame 41a is a member installed above the upper die 30 and extending in the horizontal direction parallel to the X-axis.

The slide frame 41b is a member extending in the perpendicular direction parallel to the Z-axis, which is a member attached movably along the Z-axis relative to the fixing frame 41a. The slide frame 41b is made of aluminum, for example. It is preferable that the slide frame 41b be a partially hollowed light weight structure. The lower end of the slide frame 41b is connected to the forming member 21.

The drive unit 41c has a motor, for example, and generates drive force for moving the slide frame 41b along the Z-axis relative to the fixing frame 41a. The drive unit 41c moves the slide frame 41b downward along the Z-axis and thereby presses the side surface 21b of the forming member 21 against the laminated body 200 to form the laminated body 200 held between the side surface 21b and the side surface 12 of the lower die 10.

Further, the drive unit 41c further moves the slide frame 41b downward along the Z-axis and thereby presses the under surface 21a of the forming member 21 against the laminated body 200 to form the laminated body 200 held between the under surface 21a and the bottom surface 15 of the lower die. Similarly, the drive unit 41c presses the convex surface 21c of the forming member 21 against the laminated body 200 to form the laminated body 200 held between the convex surface 21c and the concave surface 14 of the lower die.

The pushing force generating unit 41 has been described above, and since the same applies to the pushing force generating units 42, 43, 44, 45, 46, 47, 48, and 49, the description thereof will be omitted below. As illustrated in FIG. 4, the pushing force generating unit 42 has a fixing frame 42a, a slide frame 42b, and a drive unit 42c. The pushing force generating unit 43 has a fixing frame 43a, a slide frame 43b, and a drive unit 43c. The pushing force generating unit 44 has a fixing frame 44a, a slide frame 44b, and a drive unit 44c.

The pushing force generating unit 45 has a fixing frame 45a, a slide frame 45b, and a drive unit 45c. The pushing force generating unit 46 has a fixing frame 46a, a slide frame 46b, and a drive unit 46c. The pushing force generating unit 47 has a fixing frame 47a, a slide frame 47b, and a drive unit 47c. The pushing force generating unit 48 has a fixing frame 48a, a slide frame 48b, and a drive unit 48c. The pushing force generating unit 49 has a fixing frame 49a, a slide frame 49b, and a drive unit 49c.

The control unit 50 is a device that controls the pushing force generating mechanism 40. As illustrated in FIG. 5, the control unit 50 transfers control signals to the pushing force generating units 41 to 49 via signal lines 51, respectively. The control unit 50 controls a plurality of pushing force generating units 41 to 49 so that a pair of forming members arranged adjacent in the longitudinal direction LD are pressed against the lower die 10 at different timings from each other, as described later.

Figure 6:
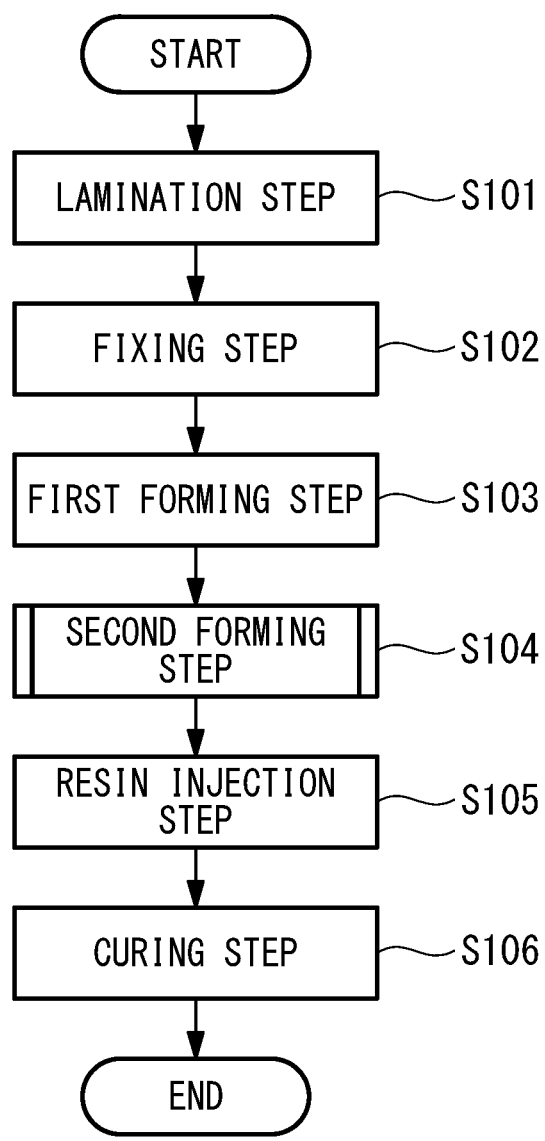
FIG. 6 is a flowchart illustrating a composite material molding method using the forming device.
Figure 7:
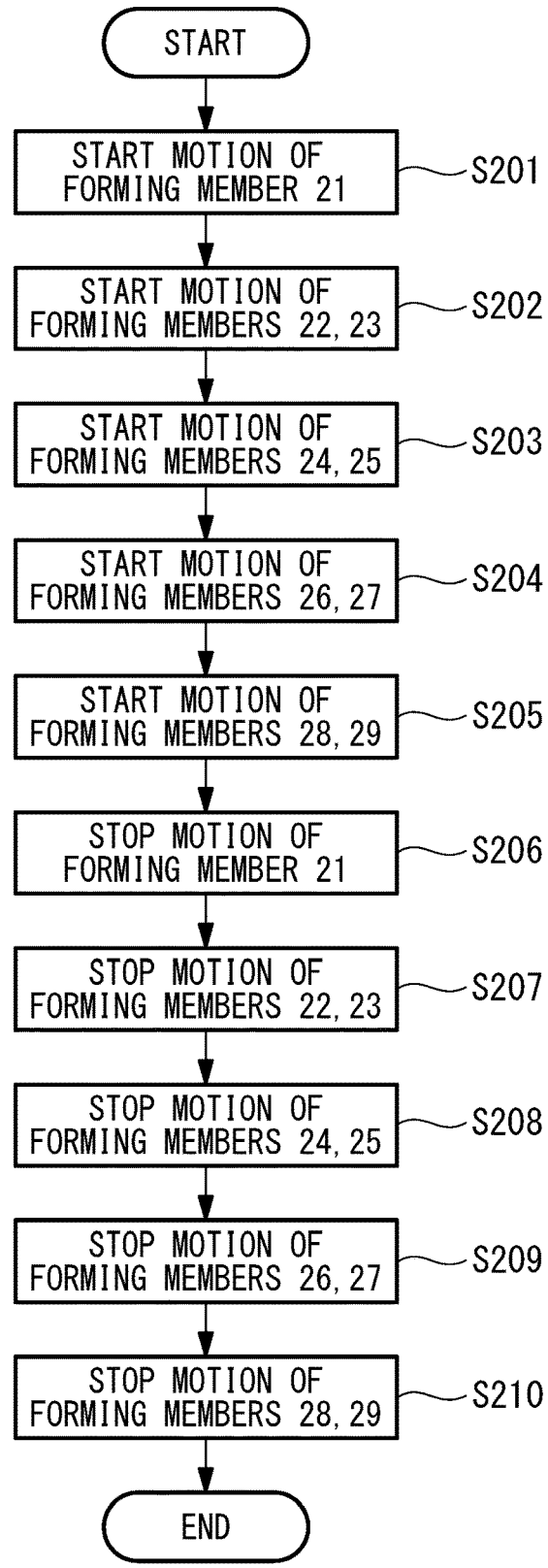
FIG. 7 is a flowchart of a second forming step illustrated in FIG. 6.
Figure 8:
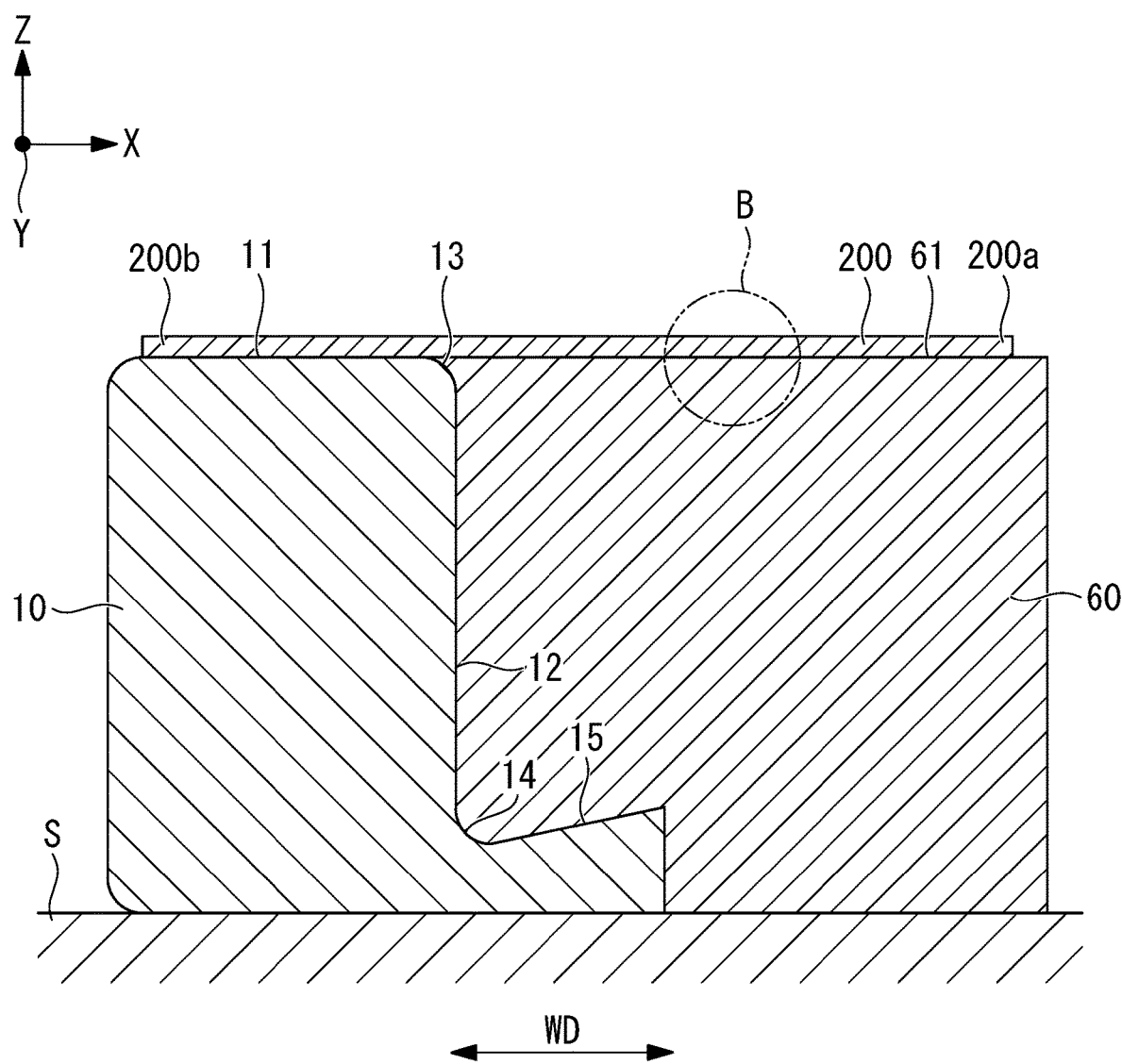
FIG. 8 is a sectional view illustrating the forming device in a lamination step of FIG. 6.

Next, a composite material molding method for molding a composite material by using the forming device 100 of the present embodiment to form the laminated body 200 will be described with reference to FIG. 6 to FIG. 13. FIG. 6 is a flowchart illustrating the composite material molding method using the forming device 100. FIG. 7 is a flowchart of a forming step illustrated in FIG. 6. FIG. 8 is a sectional view illustrating the forming device 100 in a lamination step of FIG. 6.

In the lamination step of step S101, a plurality of fiber sheets are laminated, and thereby the laminated body 200 is made. As illustrated in FIG. 8, in a state where a sub-die 60 is assembled to the lower die 10, a horizontal surface is established by the upper surface 11 of the lower die 10 and an upper surface 61 of the sub-die 60, and a plurality of reinforced fiber sheets are laminated one by one on the horizontal surface.

Figure 9:
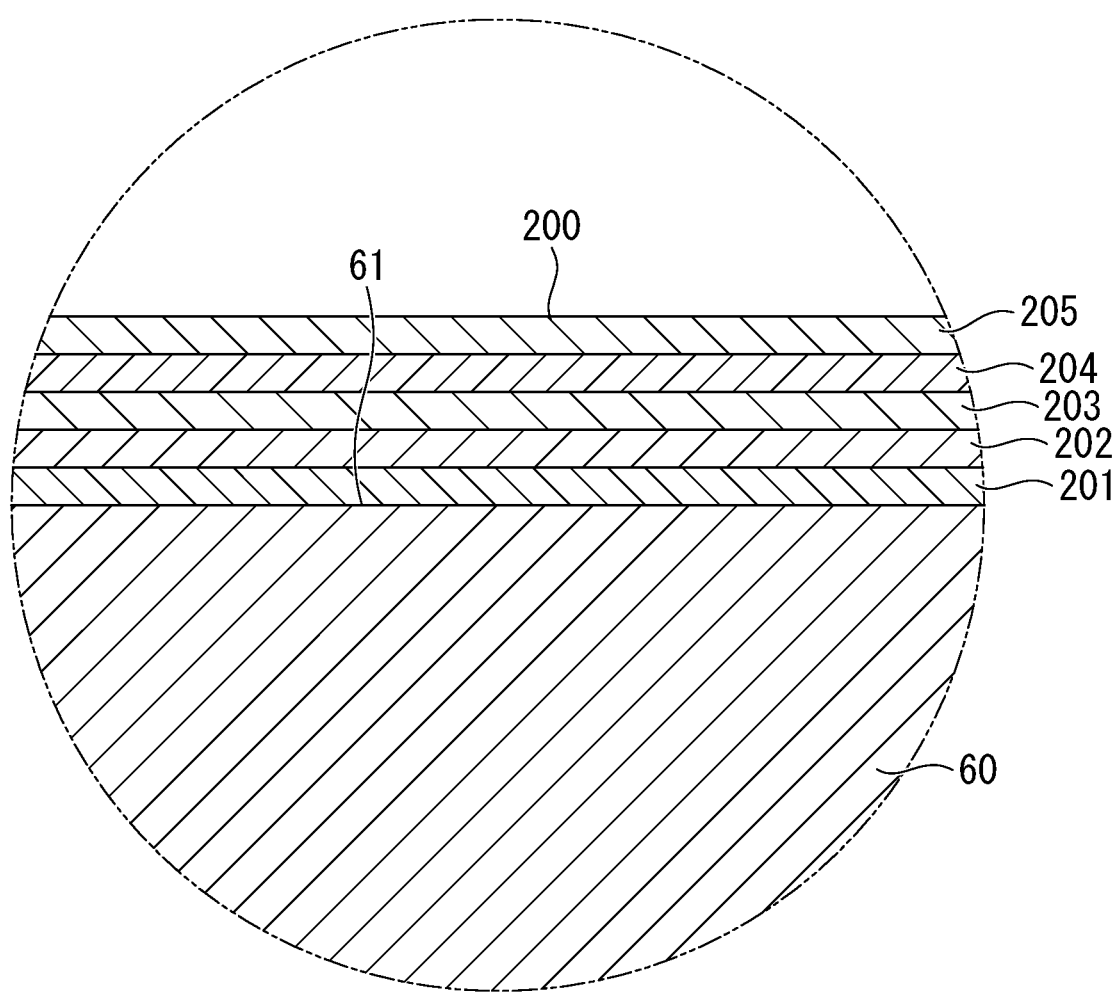
FIG. 9 is a partial enlarged view of portion B of FIG. 8.

FIG. 9 is a partial enlarged view of portion B of FIG. 8. As illustrated in FIG. 9, reinforced fiber sheets 201, 202, 203, 204, and 205 are laminated in this order on the upper surface 11 of the lower die 10 and the upper surface 61 of the sub-die 60, and thereby a planar laminated body 200 is made. Note that the number of layers of the reinforced fiber sheets of the laminated body 200 may be any number.

In a fixing step of step S102, the second end region 200b of the laminated body 200 is fixed on the upper surface 11 of the lower die 10. For example, the laminated body 200 is fixed to the lower die 10 by attaching a fixing member (not illustrated) to the upper surface 11 and holding the second end region 200b between the fixing member (not illustrated) and the upper surface 11. After the laminated body 200 is fixed to the lower die 10, the sub-die 60 is removed from the lower die 10.

In a first forming step of step S103, the upper die 30 is pressed against the upper surface 11 adjacent to one side in the width direction WD of the convex surface 13 of the lower die 10 to form the laminated body 200. Specifically, the upper die 30 is installed above the second end region 200b of the laminated body 200 fixed to the upper surface 11 of the lower die 10, the pushing force generating mechanism 40 is installed above the upper die 30, and the second end region 200b of the laminated body 200 is formed along the shape of the upper surface 11 by the weights of the upper die 30 and the pushing force generating mechanism 40.

Although the laminated body 200 is formed along the shape of the lower die 10 by the weights of the upper die 30 and the pushing force generating mechanism 40 herein, another manner may be possible. For example, the upper die 30 can also be structured such that the laminated body 200 is fixed to the lower die 10 to have a predetermined thickness by using a fastening structure. In such a case, by adjusting the predetermined thickness, it is possible to suitably adjust the forming force of the upper die 30 pressing the laminated body 200 against the lower die 10.

In a second forming step of step S104, the upper die 20 is pressed against the laminated body 200 downward along the Z-axis by the pushing force generating mechanism 40 to form the laminated body 200 along the surface shape of the lower die 10. Herein, the second forming step will be described in detail with reference to FIG. 7.

As illustrated in FIG. 7, in step S201, the control unit 50 controls the drive unit 41c of the pushing force generating unit 41 to start motion of the forming member 21 toward the lower die 10 from the state illustrated in FIG. 3.

In step S202, the control unit 50 controls the drive units 42c, 43c of the pushing force generating units 42, 43 to start motion of the forming members 22, 23 toward the lower die 10 at a timing that a predetermined time has elapsed from the start of the motion of the forming member 21 toward the lower die 10.

In step S203, the control unit 50 controls the drive units 44c, 45c of the pushing force generating units 44, 45 to start motion of the forming members 24, 25 toward the lower die 10 at a timing that a predetermined time has elapsed from the start of the motion of the forming members 22, 23 toward the lower die 10.

In step S204, the control unit 50 controls the drive units 46c, 47c of the pushing force generating units 46, 47 to start motion of the forming members 26, 27 toward the lower die 10 at a timing that a predetermined time has elapsed from the start of the motion of the forming members 24, 25 toward the lower die 10.

In step S205, the control unit 50 controls the drive units 48c, 49c of the pushing force generating units 48, 49 to start motion of the forming members 28, 29 toward the lower die 10 at a timing that a predetermined time has elapsed from the start of the motion of the forming members 26, 27 toward the lower die 10. With the above operations, each motion of the forming members 21 to 29 toward the lower die 10 is started, and the state illustrated in FIG. 10 and FIG. 11 is obtained.

Figure 10:
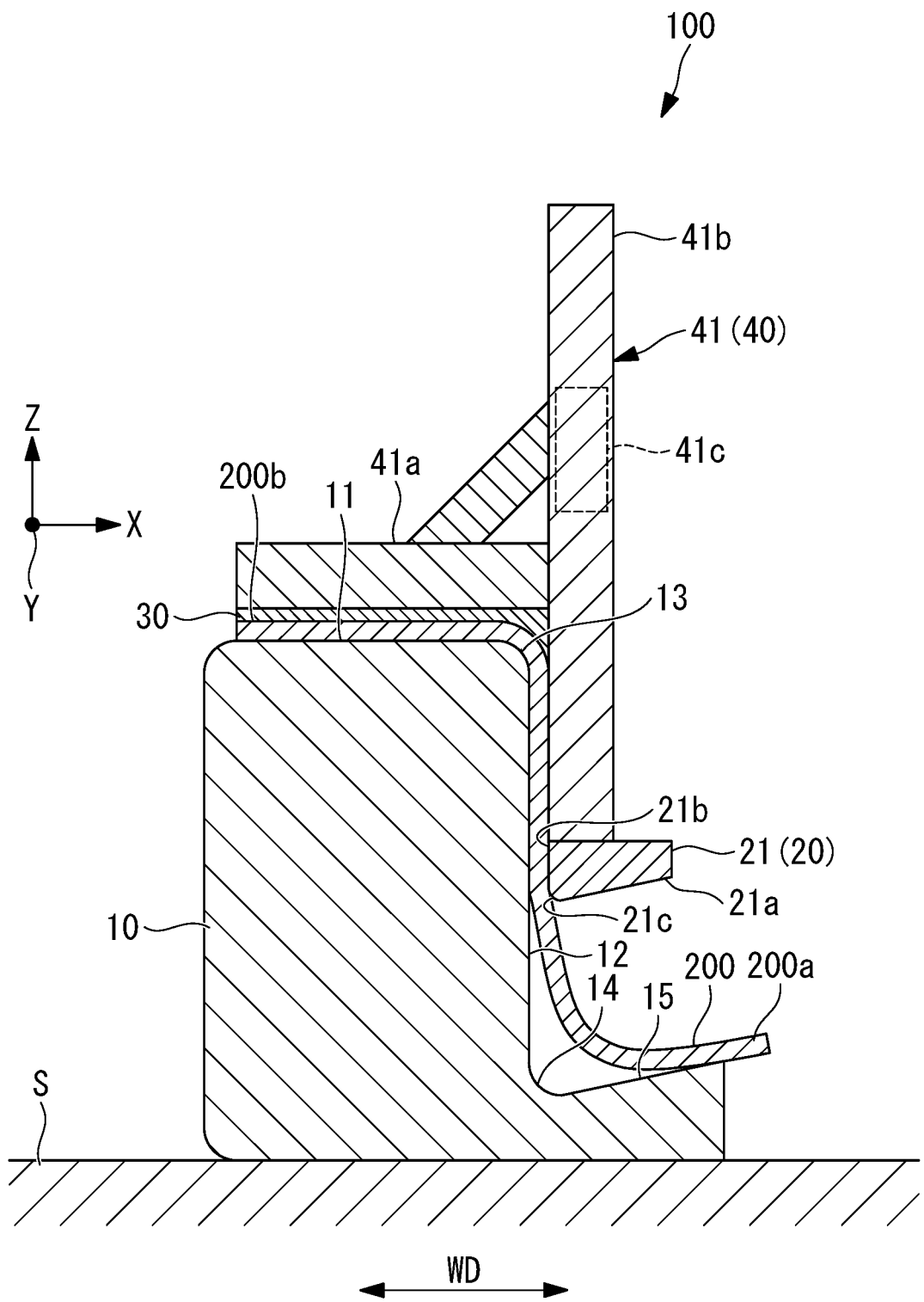
FIG. 10 is a sectional view illustrating the forming device in the second forming step of FIG. 6 and illustrates a state where the upper die is moving toward the lower die.

FIG. 10 is a sectional view illustrating the forming device 100 in the second forming step of FIG. 6 and illustrates a state where the upper die 20 is moving toward the lower die 10. FIG. 11 is a right side view of the forming device 100 illustrated in FIG. 10 and illustrates a state where the upper die 20 is moving toward the lower die 10. FIG. 10 is a sectional view taken along the arrow C-C of FIG. 11.

As illustrated in FIG. 10, when the forming member 21 moves along the side surface 12 of the lower die 10 from above to below along the Z-axis, the laminated body 200 is pressed against the side surface 12 of the lower die 10 by the side surface 21b of the forming member 21 to form the laminated body 200 along the shape of the side surface 12.

Figure 11:
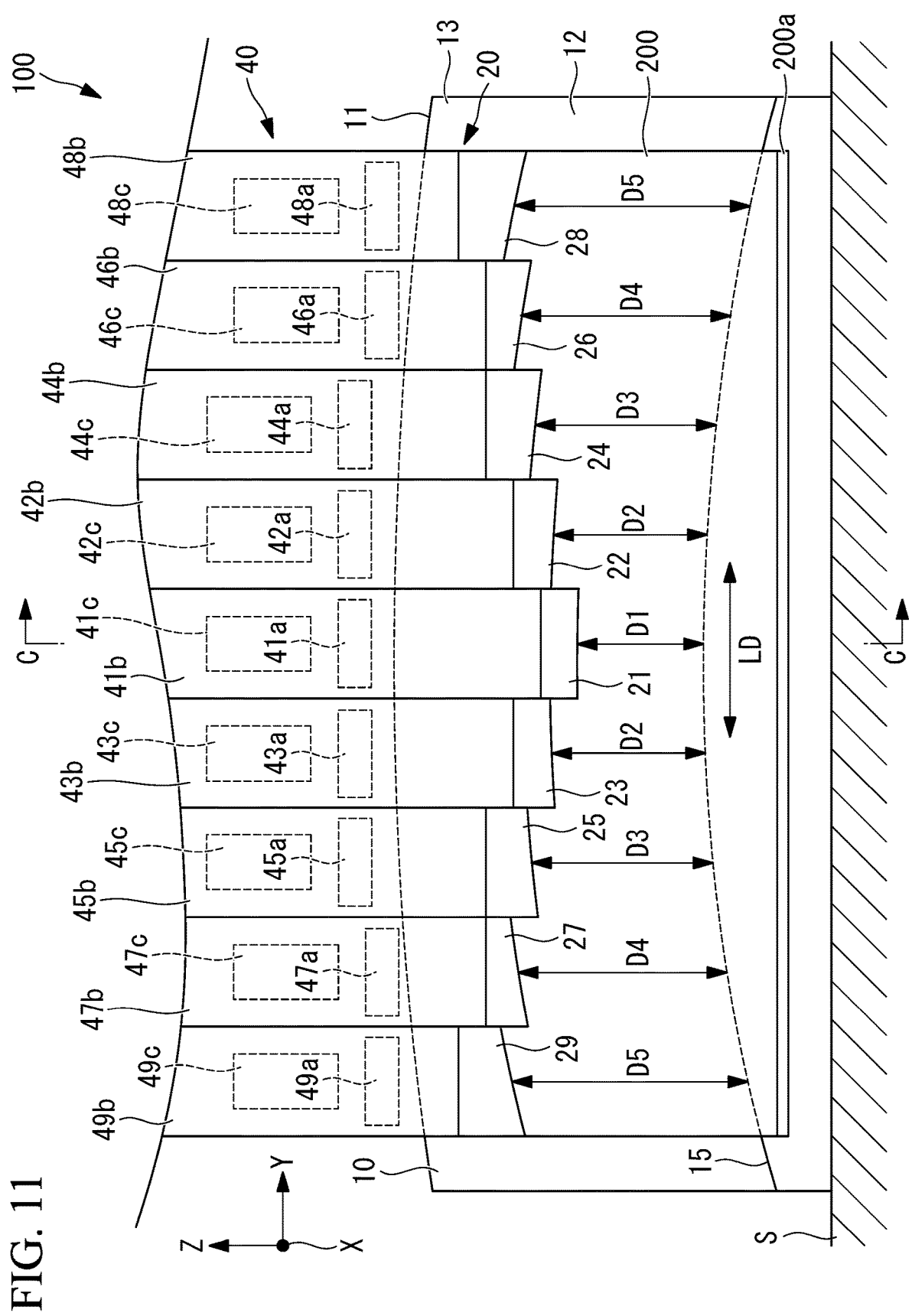
FIG. 11 is a right side view of the forming device illustrated in FIG. 10 and illustrates a state where the upper die is moving toward the lower die.

As illustrated in FIG. 11, the distances in the Z-axis direction from the forming members 21 to 29 to the bottom surface 15 of the lower die 10 are not the same. The distance in the Z-axis direction from the forming member 21 to the bottom surface 15 is D1, each distance in the Z-axis direction from the forming members 22, 23 to the bottom surface 15 is D2, and each distance in the Z-axis direction from the forming members 24, 25 to the bottom surface 15 is D3. Further, each distance in the Z-axis direction from the forming members 26, 27 to the bottom surface 15 is D4, and each distance in the Z-axis direction from the forming members 28, 29 to the bottom surface 15 is D5. As illustrated in FIG. 11, the distance D2 is longer than the distance D1, the distance D3 is longer than the distance D2, the distance D4 is longer than the distance D3, and the distance D5 is longer than distance D4.

As illustrated in FIG. 11, the distances in the Z-axis direction from the forming members 21 to 29 to the bottom surface 15 of the lower die 10 are not the same, because timings to move respective forming members toward the lower die 10 have been differentiated. The control unit 50 controls the pushing force generating units 41 to 49 so that the timings that the forming members 22 to 29 arranged on the end side with respect to the center position in the longitudinal direction LD of the laminated body 200 are moved toward the lower die 10 are delayed from the timing that the forming member 21 arranged at the center position (predetermined position) in the longitudinal direction LD of the lower die 10 is moved toward the lower die 10.

Further, the control unit 50 controls the pushing force generating units 41 to 49 so that a plurality of forming members 22 to 29 are pressed against the lower die 10 sequentially from the center position in the longitudinal direction LD of the lower die 10 to the ends of the longitudinal direction LD of the laminated body 200 with the timings being sequentially delayed from the timing for the forming member 21. The control unit 50 controls the pushing force generating units 41 to 49 to first press the forming member 21 against the lower die 10, subsequently press the forming members 22, 23 against the lower die 10, subsequently press the forming members 24, 25 against the lower die 10, subsequently press the forming members 26, 27 against the lower die 10, and finally press the forming members 28, 29 against the lower die 10.

In step S206, the control unit 50 controls the pushing force generating unit 41 to stop the motion of the forming member 21 in response to establishment of a state where the laminated body 200 is held between the forming member 21 and the bottom surface 15 of the lower die 10.

In step S207, the control unit 50 controls the pushing force generating units 42, 43 to stop the motion of the forming members 22, 23 in response to establishment of a state where the laminated body 200 is held between the forming members 22, 23 and the bottom surface 15 of the lower die 10.

In step S208, the control unit 50 controls the pushing force generating units 44, 45 to stop the motion of the forming members 24, 25 in response to establishment of a state where the laminated body 200 is held between the forming members 24, 25 and the bottom surface 15 of the lower die 10.

In step S209, the control unit 50 controls the pushing force generating units 46, 47 to stop the motion of the forming members 26, 27 in response to establishment of a state where the laminated body 200 is held between the forming members 26, 27 and the bottom surface of the lower die 10.

In step S210, the control unit 50 controls the pushing force generating units 48, 49 to stop the motion of the forming members 28, 29 in response to establishment of a state where the laminated body 200 is held between the forming members 28, 29 and the bottom surface 15 of the lower die 10. In response to the end of step S210, the state illustrated in FIG. 12 and FIG. 13 is established.

Figure 12:
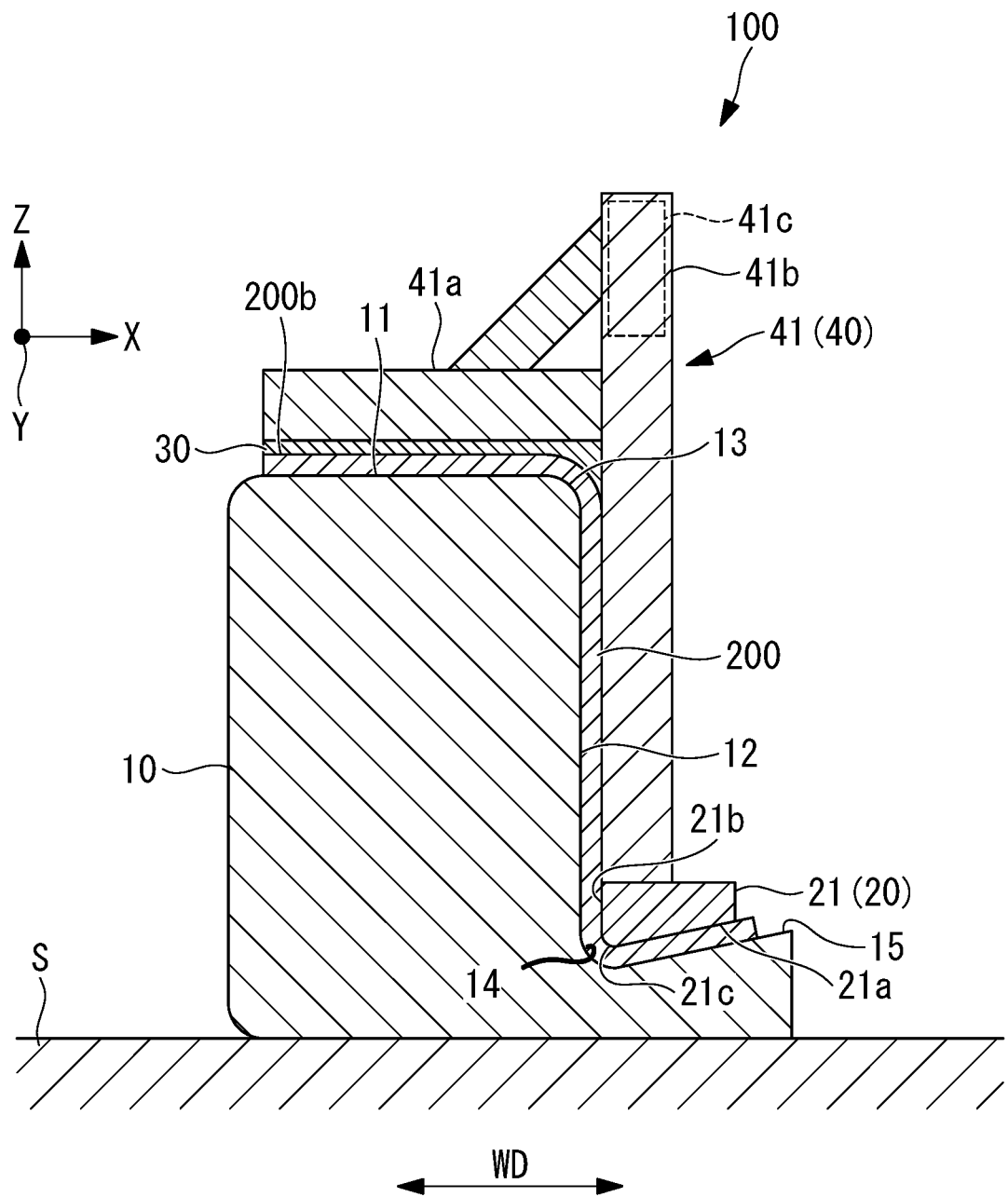
FIG. 12 is a sectional view illustrating the forming device in the second forming step of FIG. 6 and illustrates a state where the upper die has completed the motion toward the lower die and stops.
Figure 13:
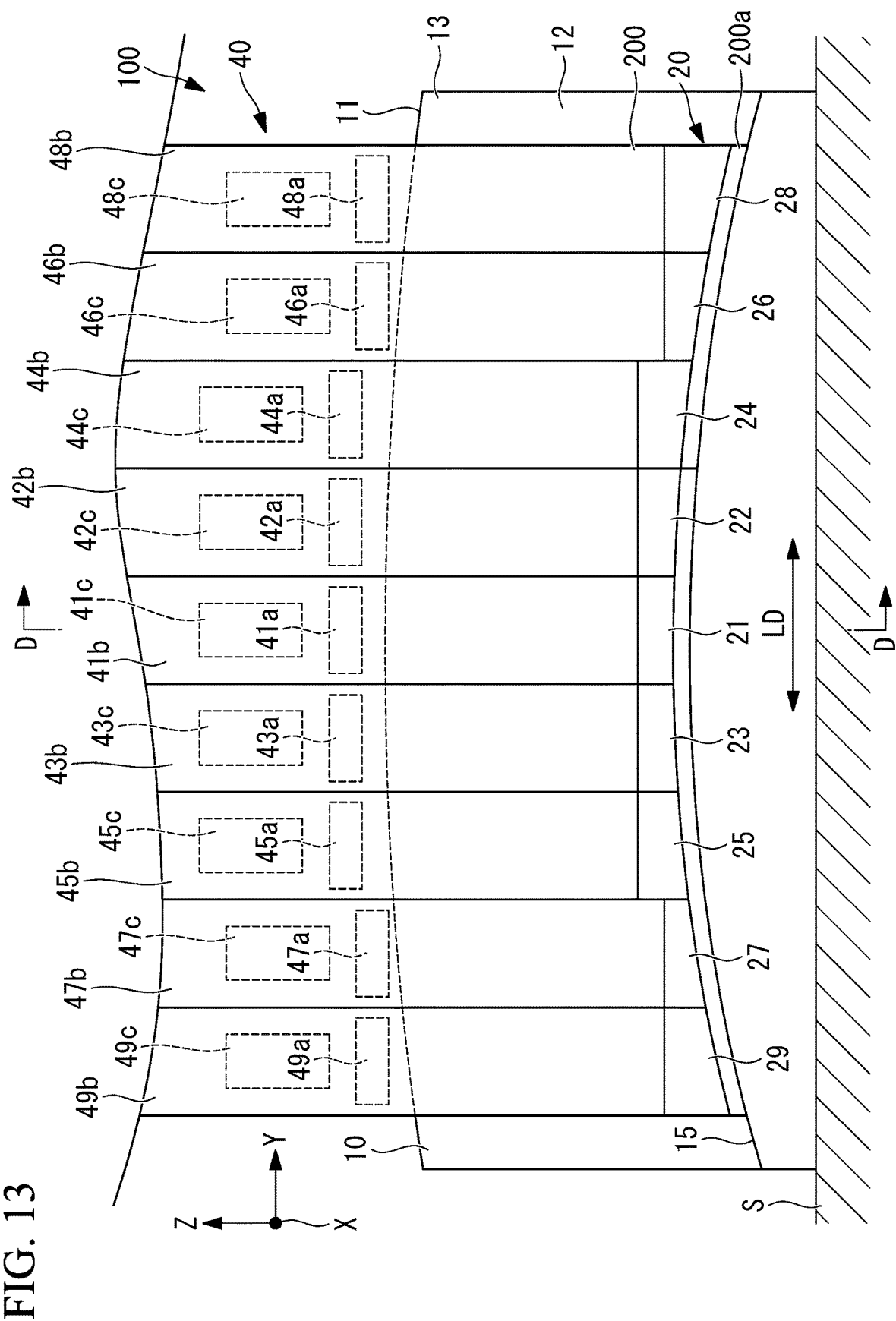
FIG. 13 is a right side view of the forming device illustrated in FIG. 11 and illustrates a state where the upper die has completed the motion toward the lower die.

FIG. 12 is a sectional view illustrating the forming device 100 in the second forming step of FIG. 6 and illustrates a state where the motion of the upper die 20 toward the lower die 10 has completed. FIG. 13 is a right side view of the forming device 100 illustrated in FIG. 12 and illustrates a state where the motion of the upper die 20 toward the lower die 10 has completed. FIG. 12 is a sectional view taken along the arrow D-D of FIG. 13. With the above operations, the process of the second forming step of FIG. 6 ends.

Although, in the above second forming step, the forming member 21 arranged at the center in the longitudinal direction LD out of the plurality of forming members 21 to 29 is moved toward the lower die 10 at the earliest timing, another manner may be possible. For example, when a portion having a large shape change in the longitudinal direction LD (a portion where a wrinkle is likely to occur) is present at a predetermined position in the longitudinal direction LD, it is preferable to move a forming member closest to that portion at the earliest timing toward the lower die 10. In such a case, the control unit 50 performs control to first move the forming member close to the portion having a large shape change in the longitudinal direction LD, toward the lower die 10 and then move the forming members adjacent thereto toward the lower die 10.

For some shape of the lower die 10, it may be suitable to move forming members toward the lower die 10 simultaneously at a plurality of positions (for example, adjacent positions) in the longitudinal direction LD in order to suppress a wrinkle. In such a case, the control unit 50 controls the pushing force generating units 41 to 49 to move two or more forming members of the forming members 21 to 29 simultaneously toward the lower die 10.

Further, it is preferable to store in advance, in a storage unit (not illustrated), timings to start motion of the plurality of forming members 21 to 29 suitable to suppress occurrence of a wrinkle in the laminated body 200 when forming the laminated body 200 by using the lower die 10, the upper die 20, and the upper die 30. In such a case, in the second forming step of FIG. 6, the control unit 50 reads the timings to start motion of the plurality of forming members 21 to 29 stored in the storage unit and controls the timings to start motion of the plurality of forming members 21 to 29.

In a resin injection step of step S105, the laminated body 200 formed along the surface shapes of the lower die 10 and the upper die 20 is arranged in a molding die (not illustrated). A resin material is then injected inside the molding die to impregnate the resin material into the plurality of reinforced fiber sheets of the laminated body 200.

The resin injection step may be performed by vacuum assisted resin transfer molding (VaRTM) in which only the lower die 10 is used, the upper surface of the laminated body 200 formed by the lower die 10 is covered with a vacuum bag film (not illustrated) to reduce the internal pressure, and then a resin is injected therein.

In a curing step of step S106, the resin material impregnated into the plurality of reinforced fiber sheets of the laminated body 200 is cured. When the resin material is thermosetting, the resin material is heated at a curing temperature or higher to cure the resin material. When the resin material is a thermoplastic resin, the resin material is cooled at a temperature lower than a softening temperature to cure the resin material. With step S101 to step S106 described above, a composite material molding method for forming the laminated body 200 to mold a composite material by using the forming device 100 is performed.

Effects and advantages achieved by the forming device 100 of the present embodiment described above will be described.

According to the forming device 100 of the present embodiment, the upper die 20 is pressed against the lower die 10 having the convex surface 13 with respect to the width direction WD, and thereby the laminated body 200 is formed along the surface shape of the lower die 10. The pushing force generating mechanism 40 is controlled by the control unit 50 to apply, to the upper die 20, pushing force for performing the pressing against the lower die 10.

The upper die 20 has the plurality of forming members 21 to 29 aligned in the longitudinal direction LD, and the plurality of pushing force generating units 41 to 49 of the pushing force generating mechanism 40 are connected thereto, respectively. The control unit 50 controls the plurality of pushing force generating units 41 to 49 so that a pair of forming members arranged adjacent in the longitudinal direction LD are pressed against the lower die 10 at different timings from each other.

According to the forming device 100 of the present embodiment, a pair of forming members arranged adjacent in the longitudinal direction LD are pressed against the lower die 10 at different timings from each other. When one of the pair of forming members forms the laminated body 200 held between the one and the lower die 10, a clearance is formed between the other of the pair of forming members and the lower die 10, and therefore, deformation of the laminated body 200 is tolerated. Thus, compared to a case where press molding using molds with an upper die of one-piece structure and a lower die of one-piece structure is performed or a case where all the plurality of forming members are pressed against the lower die 10 at the same timing in the forming device 100, it is possible to suppress occurrence of a wrinkle which would otherwise be caused by not tolerating deformation of the laminated body 200.

According to the forming device 100 of the present embodiment, the timing to move the forming members 22, 23, which are arranged on the end side of the laminated body 200 with respect to a predetermined position in the longitudinal direction LD (for example, the center position), toward the lower die 10 is delayed from the timing to move the forming member 21, which is arranged at the predetermined position, toward the lower die 10, and thereby deformation of the laminated body 200 occurring when the forming members 21 to 29 are pressed against the lower die 10 can be propagated from the predetermined position to the ends of the laminated body 200. Accordingly, it is possible to suppress occurrence of a wrinkle which would otherwise be caused by not tolerating deformation of the laminated body 200.

According to the forming device 100 of the present embodiment, the plurality of forming members 21 to 29 are pressed against the lower die 10 sequentially from the predetermined position to the ends of the laminated body 200 with sequentially delayed timings. Thus, deformation of the laminated body 200 occurring when the forming members 21 to 29 are pressed against the lower die 10 is propagated continuously from the predetermined position to the ends of the laminated body 200 without being retained between the lower die 10 and the upper die 20, and occurrence of a wrinkle can be suppressed.

According to the forming device 100 of the present embodiment, by pressing the laminated body 200 against the upper surface 11 adjacent to one side in the width direction WD of the convex surface 13 of the lower die 10, it is possible to form a region on one side in the width direction WD of the laminated body 200 along the shape of the upper surface 11. Further, by pressing the upper die 20 against the side surface 12 adjacent to the other side in the width direction WD of the convex surface 13 of the lower die 10, it is possible to form a region on the other side in the width direction WD of the laminated body 200 along the shape of the side surface 12. Further, it is possible to form the region interposed between the one side and the other side in the width direction WD of the laminated body 200 along the shape of the convex surface 13.

According to the forming device 100 of the present embodiment, by moving the upper die 20 along the side surface 12 of the lower die 10, it is possible to form the laminated body 200 along the side surface 12 from a region close to the convex surface 13 to the end in the width direction WD while tolerating deformation of the laminated body 200. Since the laminated body 200 is formed while deformation thereof is tolerated, occurrence of a wrinkle can be suppressed.

Second Embodiment

Next, a forming device 100A according to the second embodiment of the present disclosure will be described with reference to the drawings. The present embodiment is a modified example of the first embodiment, and except as specifically described below, the present embodiment is the same as the first embodiment, and duplicated description will be omitted below.

Figure 14:
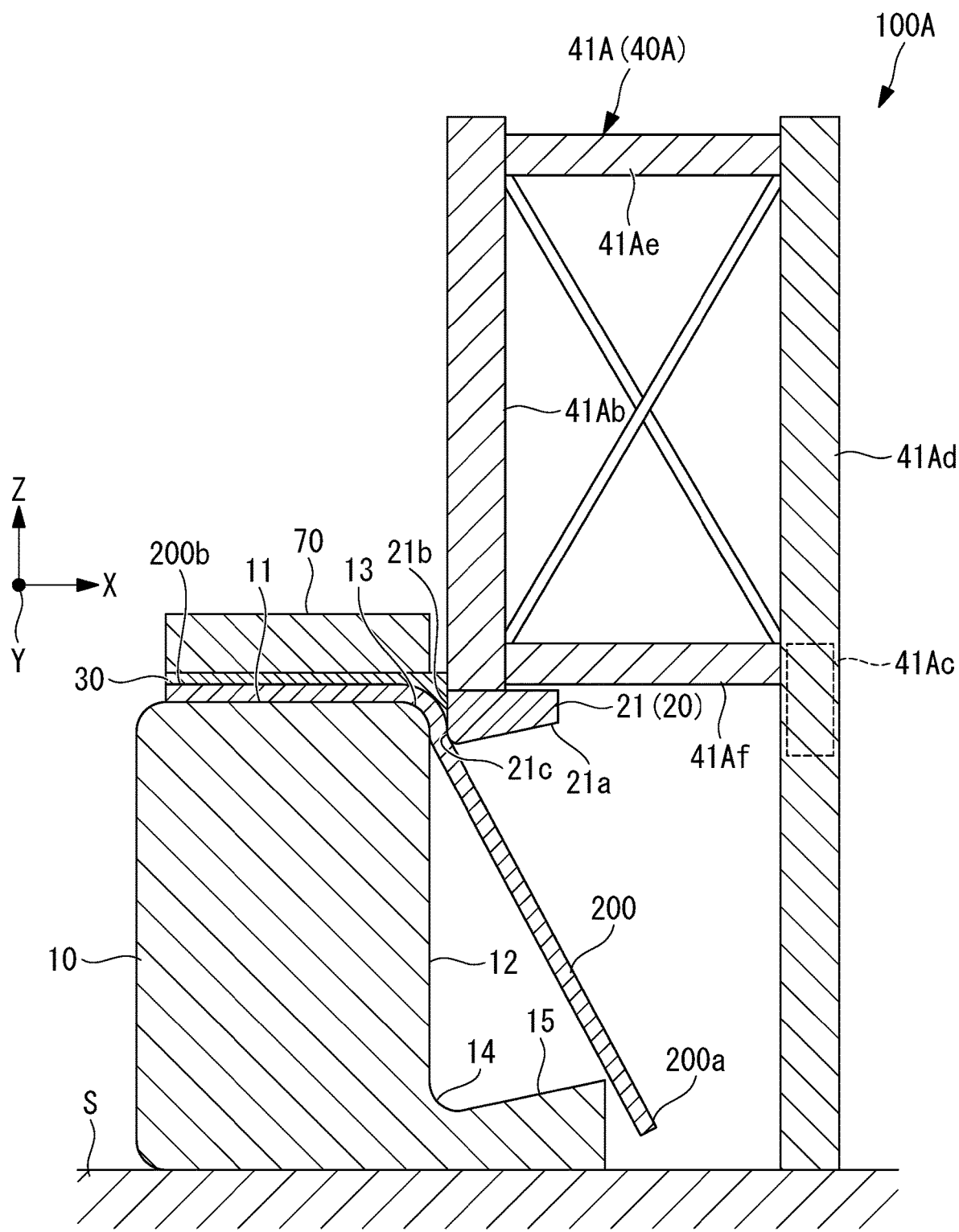
FIG. 14 is a sectional view illustrating a forming device according to a second embodiment of the present disclosure and illustrates a state before the upper die starts motion toward the lower die.
Figure 15:
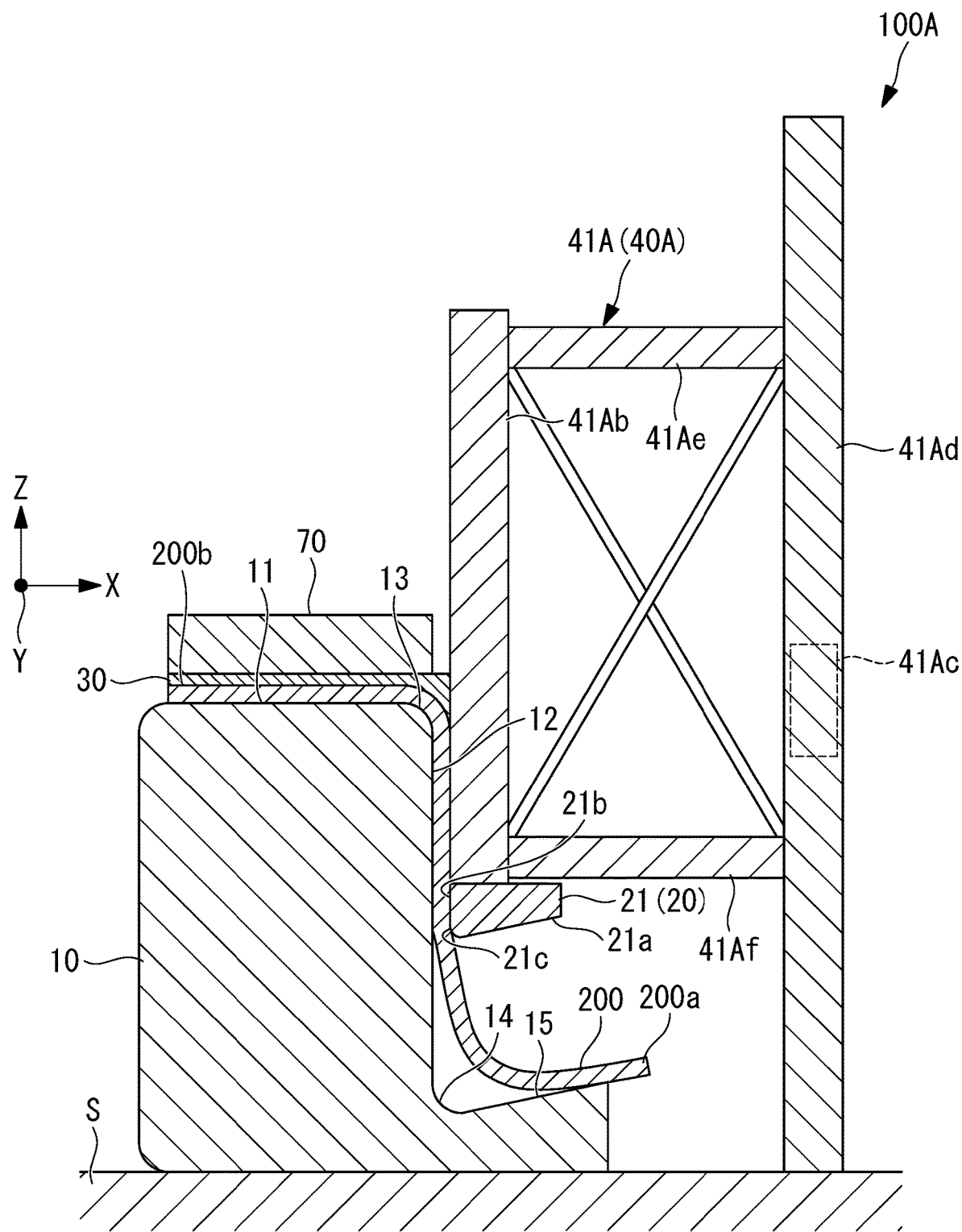
FIG. 15 is a sectional view illustrating the forming device according to the second embodiment of the present disclosure and illustrates a state where the upper die is moving toward the lower die.
Figure 16:
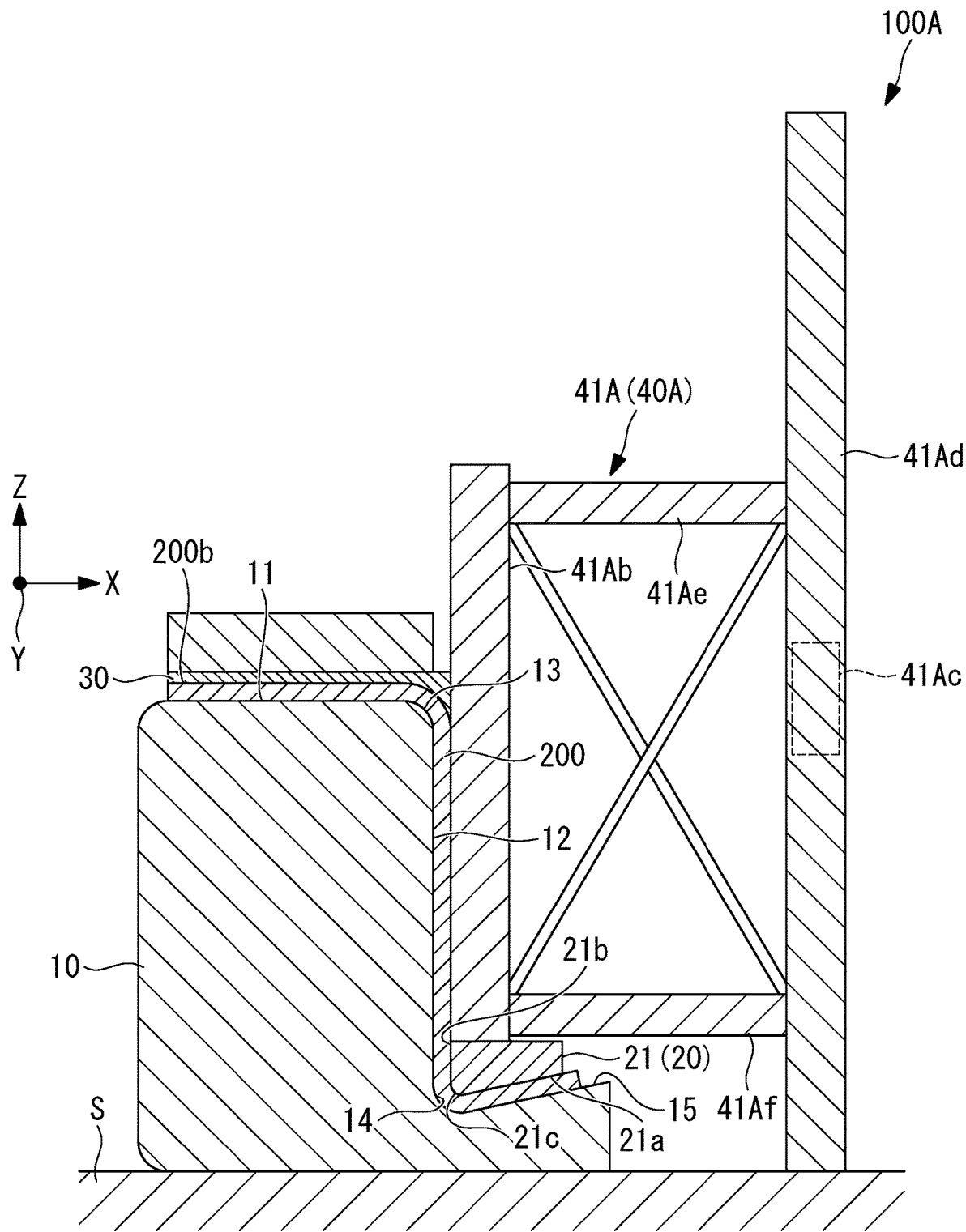
FIG. 16 is a sectional view illustrating the forming device according to the second embodiment of the present disclosure and illustrates a state where the upper die has completed the motion toward the lower die.

FIG. 14 is a sectional view illustrating the forming device 100A according to the present embodiment and illustrates a state before the upper die 20 starts motion toward the lower die 10. FIG. 15 is a sectional view illustrating the forming device 100A according to the present embodiment and illustrates a state where the upper die 20 is moving toward the lower die 10. FIG. 16 is a sectional view illustrating the forming device 100A according to the present embodiment and illustrates a state where the upper die 20 has completed the motion toward the lower die 10.

In the forming device 100 of the first embodiment, the pushing force generating mechanism 40 is to move the slide frame 41b relative to the fixing frame 41a installed above the upper die 20. In contrast, a pushing force generating mechanism 40A of the forming device 100A of the present embodiment is to move a slide frame 41Ab relative to a support frame 41Ad installed on the installation surface S.

As illustrated in FIG. 14 to FIG. 16, the pushing force generating unit 41A of the pushing force generating mechanism 40A of the forming device 100A has the slide frame 41Ab, the support frame 41Ad, and connection frames 41Ae and 41Af. The lower end of the slide frame 41Ab is connected to the forming member 21. A plate 70 for applying pushing force used for forming the laminated body 200 to the upper die 30 is arranged above the upper die 30.

The support frame 41Ad is fixed to the installation surface S. The slide frame 41Ab is fixed to the connection frames 41Ae, 41Af. The connection frames 41Ae, 41Af are attached to the support frame 41Ad movably along the Z-axis. The slide frame 41Ab moves in a direction along the Z-axis integrally with the connection frames 41Ae, 41Af in response to drive force being applied by the drive unit 41Ac.

Since the support frame 41Ad is fixed to the installation surface S, the forming device 100A of the present embodiment is reliably supported by the support frame 41Ad so that the slide frame 41Ab is not separated from the side surface 12 of the lower die 10. Thus, when the upper die 20 is moved toward the lower die 10, pushing force for pressing the laminated body 200 against the lower die 10 can be reliably applied.

The forming devices described in the above embodiments are understood as follows, for example.

The forming device according to the present disclosure is a forming device (100) for forming a laminated body (200) of a plurality of laminated sheet materials containing reinforced fibers, the forming device includes: a first forming die (10) having a curved surface (13) that extends in a longitudinal direction (LD) and includes at least any one of a concave shape and a convex shape with respect to a width direction (WD); a second forming die (20) configured to form the laminated body along a surface shape of the first forming die by pressing the laminated body against the first forming die; a pushing force generating mechanism (40) configured to generate pushing force for pressing the second forming die against the first forming die; and a control unit (50) configured to control the pushing force generating mechanism, the second forming die has a plurality of forming members (21 to 29) aligned in the longitudinal direction, the pushing force generating mechanism has a plurality of pushing force generating units (41 to 49) connected to the plurality of forming members and configured to generate pushing force for pressing the forming members against the first forming die, and the control unit controls the plurality of pushing force generating units so as to press a pair of the forming members arranged adjacent in the longitudinal direction against the first forming die at different timings from each other.

According to the forming device of the present disclosure, the second forming die is pressed against the first forming die having the curved surface including at least any one of a concave shape and a convex shape with respect to the width direction, and thereby the laminated body is formed along the surface shape of the first forming die. The pushing force generating mechanism is controlled by the control unit to apply, to the second forming die, pushing force for performing the pressing against the first forming die.

The second forming die has a plurality of forming members aligned in the longitudinal direction, and a plurality of pushing force generating units of the pushing force generating mechanism are connected thereto, respectively. The control unit controls the plurality of pushing force generating units so that a pair of forming members arranged adjacent in the longitudinal direction are pressed against the first forming die at different timings from each other.

According to the forming device of the present disclosure, a pair of forming members arranged adjacent in the longitudinal direction are pressed against the first forming die at different timings from each other. When one of the pair of forming members forms the laminated body held between the one and the first forming die, a clearance is formed between the other of the pair of forming members and the first forming die, and therefore, deformation of the laminated body is tolerated. Thus, compared to a case where a pair of forming members are pressed against the first forming die at the same timing, it is possible to suppress occurrence of a wrinkle which would otherwise be caused by not tolerating deformation of the laminated body.

In the forming device according to the present disclosure, the plurality of forming members may include at least a forming member arranged at a predetermined position in the longitudinal direction and a forming member arranged on an end side of the laminated body with respect to the predetermined position, and the control unit may be configured to control the plurality of pushing force generating units so that a timing to move the forming member arranged on the end side toward the first forming die is delayed from a timing to move the forming member arranged at the predetermined position toward the first forming die.

According to the forming device of the present configuration, the timing to move the forming member arranged on the end side of the laminated body with respect to a predetermined position in the longitudinal direction toward the first forming die is delayed from the timing to move the forming member arranged at the predetermined position toward the first forming die, and thereby deformation of the laminated body occurring when the forming members are pressed against the first forming die can be propagated from the predetermined position to the end of the laminated body. Accordingly, it is possible to suppress occurrence of a wrinkle which would otherwise be caused by not tolerating deformation of the laminated body.

In the forming device of the above configuration, the control unit may be in a manner that controls the plurality of pushing force generating units so that the plurality of forming members are pressed against the first forming die sequentially from the predetermined position to the end of the laminated body with sequentially delayed timings.

According to the forming device of the present aspect, a plurality of forming members are pressed against the first forming die sequentially from the predetermined position to the end of the laminated body with sequentially delayed timings. Thus, deformation of the laminated body occurring when the forming members are pressed against the first forming die is propagated continuously from the predetermined position to the end of the laminated body without being retained between the first forming die and the second forming die, and occurrence of a wrinkle can be suppressed.

The forming device according to the present disclosure may include a third forming die (30) configured to press the laminated body against a first forming surface adjacent to one side in the width direction of the curved surface of the first forming die, and the pushing force generating mechanism may be configured to generate pushing force for pressing the second forming die against a second forming surface adjacent to the other side in the width direction of the curved surface of the first forming die.

According to the forming device of the present configuration, by pressing the laminated body against the first forming surface adjacent to one side in the width direction of the curved surface of the first forming die, it is possible to form a region on one side in the width direction of the laminated body along the shape of the first forming surface. Further, by pressing the second forming die against the second forming surface adjacent to the other side in the width direction of the curved surface of the first forming die, it is possible to form a region on the other side in the width direction of the laminated body along the shape of the second forming surface. Further, it is possible to form the region interposed between the one side and the other side in the width direction of the laminated body along the shape of the curved surface.

In the forming device according to the above configuration, the pushing force generating mechanism may be in a manner that forms the laminated body along the second forming surface by moving the second forming die along the second forming surface of the first forming die.

According to the forming device of the present aspect, by moving the second forming die along the second forming surface of the first forming die, it is possible to form the laminated body along the second forming surface from a region close to the curved surface to the end in the width direction while tolerating deformation of the laminated body. Since the laminated body is formed while deformation thereof is tolerated, occurrence of a wrinkle can be suppressed.

The forming methods described in the above embodiments are understood as follows, for example.

The forming method according to the present disclosure is a forming method for forming a laminated body of a plurality of laminated sheet materials containing reinforced fibers, the forming method includes: a fixing step of fixing one end of the laminated body to a first forming die having a curved surface that extends in a longitudinal direction and includes at least any one of a concave shape and a convex shape with respect to a width direction; and a forming step of forming the laminated body along a surface shape of the first forming die by pressing a second forming die having a plurality of forming members aligned in the longitudinal direction against the first forming die, and the forming step presses a pair of the forming members arranged adjacent in the longitudinal direction against the first forming die at different timings from each other.

According to the forming method of the present disclosure, the second forming die is pressed against the first forming die having the curved surface including at least any one of a concave shape and a convex shape with respect to the width direction, and thereby the laminated body is formed along the surface shape of the first forming die. The second forming die has a plurality of forming members aligned in the longitudinal direction.

According to the forming method of the present disclosure, the forming step presses a pair of forming members arranged adjacent in the longitudinal direction against the first forming die at different timings from each other. When one of the pair of forming members forms the laminated body held between the one and the first forming die, a clearance is formed between the other of the pair of forming members and the first forming die, and therefore, deformation of the laminated body is tolerated. Thus, compared to a case where a pair of forming members are pressed against the first forming die at the same timing, it is possible to suppress occurrence of a wrinkle which would otherwise be caused by not tolerating deformation of the laminated body.

In the forming method according to the present disclosure, the plurality of forming members may include at least a forming member arranged at a predetermined position in the longitudinal direction and a forming member arranged on an end side of the laminated body with respect to the predetermined position, and the forming step may be configured to delay a timing to move the forming member arranged on the end side toward the first forming die from a timing to move the forming member arranged at the predetermined position toward the first forming die.

According to the forming method of the present configuration, the timing to move the forming member arranged on the end side of the laminated body with respect to a predetermined position in the longitudinal direction toward the first forming die is delayed from the timing to move the forming member arranged at the predetermined position toward the first forming die, and thereby deformation of the laminated body occurring when the forming members are pressed against the first forming die can be propagated from the predetermined position to the end of the laminated body. Accordingly, it is possible to suppress occurrence of a wrinkle which would otherwise be caused by not tolerating deformation of the laminated body.

In the forming method of the above configuration, the forming step may be in a manner that moves the plurality of forming members so that the plurality of forming members are pressed against the first forming die sequentially from the predetermined position to the end of the laminated body with sequentially delayed timings.

According to the forming method of the present aspect, a plurality of forming members are pressed against the first forming die sequentially from the predetermined position to the end of the laminated body with sequentially delayed timings. Thus, deformation of the laminated body occurring when the forming members are pressed against the first forming die is propagated continuously from the predetermined position to the end of the laminated body without being retained between the first forming die and the second forming die, and occurrence of a wrinkle can be suppressed.

In the forming method according to the present disclosure, the forming step may be configured to form the laminated body by pressing a third forming die against a first forming surface adjacent to one end in the width direction of the curved surface of the first forming die and pressing the second forming die against a second forming surface adjacent to the other side in the width direction of the curved surface of the first forming die.

According to the forming method of the present configuration, by pressing the laminated body against the first forming surface adjacent to one side in the width direction of the curved surface of the first forming die, it is possible to form a region on one side in the width direction of the laminated body along the shape of the first forming surface. Further, by pressing the second forming die against the second forming surface adjacent to the other side in the width direction of the curved surface of the first forming die, it is possible to form a region on the other side in the width direction of the laminated body along the shape of the first forming surface. Further, it is possible to form the region interposed between the one side and the other side in the width direction of the laminated body along the shape of the curved surface.

In the forming method according to the above configuration, the forming step may be in a manner that forms the laminated body along the second forming surface by moving the second forming die along the second forming surface of the first forming die.

According to the forming method of the present aspect, by moving the second forming die along the second forming surface of the first forming die, it is possible to form the laminated body along the second forming surface from a region close to the curved surface to the end in the width direction while tolerating deformation of the laminated body. Since the laminated body is formed while deformation thereof is tolerated, occurrence of a wrinkle can be suppressed.

What is claimed is:
1. A forming device for forming a laminated body of a plurality of laminated sheet materials containing reinforced fibers, the forming device comprising:
 a first forming die having a curved surface that extends in a longitudinal direction and includes at least any one of a concave shape and a convex shape with respect to a width direction;
 a second forming die configured to form the laminated body along a surface shape of the first forming die by pressing the laminated body against the first forming die;
 a pushing force generating mechanism configured to generate pushing force for pressing the second forming die against the first forming die; and
 a control unit configured to control the pushing force generating mechanism,
 wherein the second forming die has a plurality of forming members aligned in the longitudinal direction,
 wherein the pushing force generating mechanism has a plurality of pushing force generating units connected to the plurality of forming members and configured to generate pushing force for pressing the forming members against the first forming die, wherein the plurality of forming members includes at least a forming member arranged at a predetermined position in the longitudinal direction and a forming member arranged on an end side of the laminated body with respect to the predetermined position, and wherein the control unit controls the plurality of pushing force generating units to propagate deformation of the laminated body occurring when the forming members are pressed against the first forming die from the predetermined position to the end side of the laminated body by controlling a timing to move the forming member arranged on the end side toward the first forming die to be delayed from a timing to move the forming member arranged at the predetermined position toward the first forming die.

2. The forming device according to claim 1, wherein the control unit controls the plurality of pushing force generating units so that the plurality of forming members are pressed against the first forming die sequentially from the predetermined position to the end of the laminated body with sequentially delayed timings.

3. The forming device according to claim 1 further comprising a third forming die configured to press the laminated body against a first forming surface adjacent to one side in the width direction of the curved surface of the first forming die, wherein the pushing force generating mechanism generates pushing force for pressing the second forming die against a second forming surface adjacent to the other side in the width direction of the curved surface of the first forming die.

4. The forming device according to claim 3, wherein the pushing force generating mechanism forms the laminated body along the second forming surface by moving the second forming die along the second forming surface of the first forming die.

* * * * *